J. A. TALPEY.
Fire-Escapes.
No. 141,093.
Patented July 22, 1873.
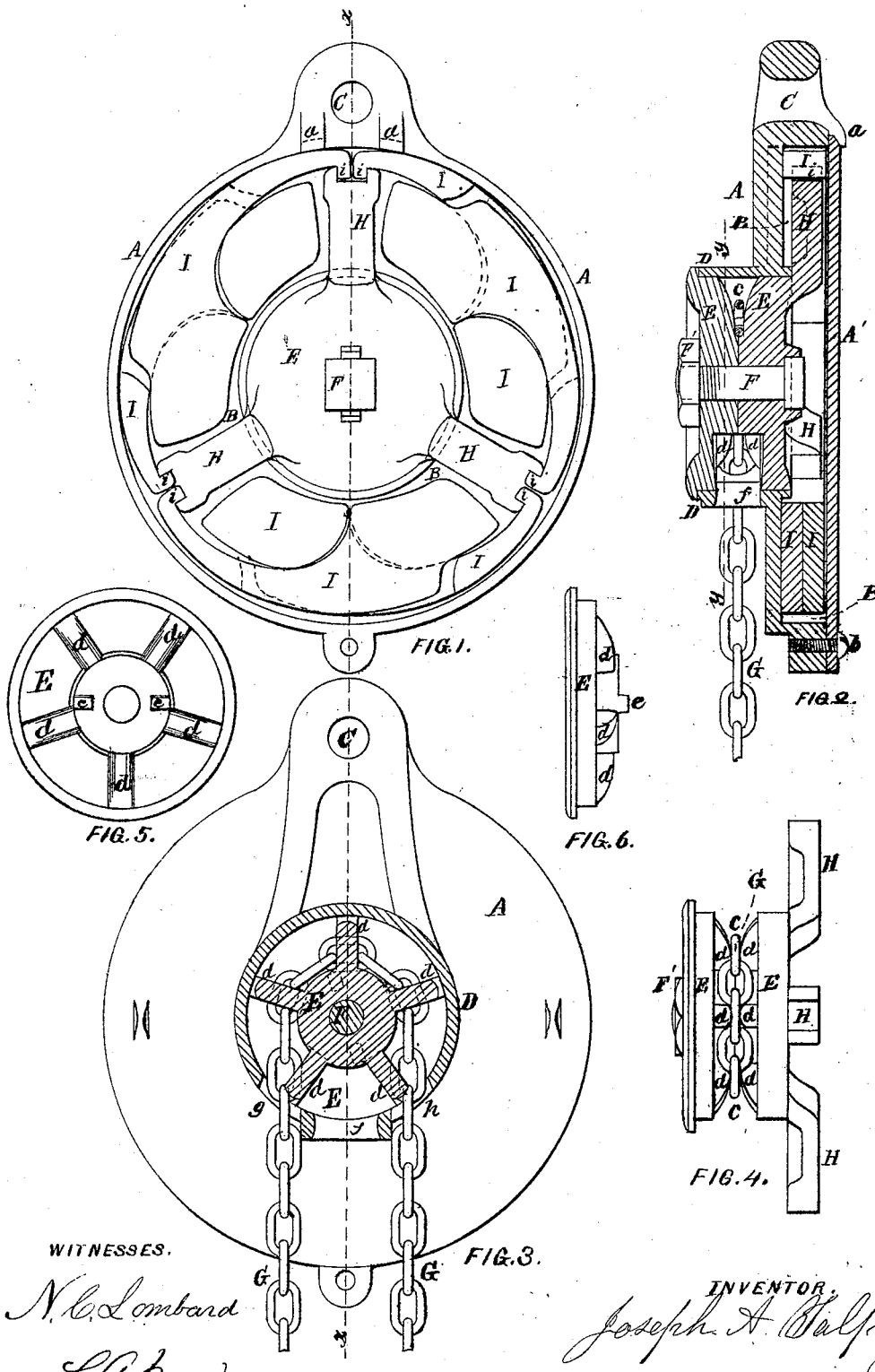
WITNESSES.
N. C. Lombard
S. A. Wood
INVENTOR.
Joseph A. Talpey

UNITED STATES PATENT OFFICE.

JOSEPH A. TALPEY, OF SOMERVILLE, ASSIGNOR TO JOHN HITCHCOCK, TRUSTEE, OF BOSTON, MASSACHUSETTS.

IMPROVEMENT IN FIRE-ESCAPES.

Specification forming part of Letters Patent No. 141,093, dated July 22, 1873; application filed June 21, 1873.

*To all whom it may concern:*

Be it known that I, JOSEPH A. TALPEY, of Somerville, in the county of Middlesex and State of Massachusetts, have invented certain new and useful Improvements in Fire-Escapes and Mechanism for Lowering Goods from Lofts, of which the following, taken in connection with the accompanying drawings, is a specification:

My invention is an improvement upon the invention for which Letters Patent were granted to me June 3, 1873, and relates more especially to certain peculiarities of construction, whereby the cost of manufacture is reduced, greater retarding force is obtained, and the apparatus is adapted to be operated by a rope or chain by making a single change or adjustment; and it consists, first, in the employment, in a portable fire-escape or in mechanism for lowering goods from lofts and for other purposes, of a grooved pulley made in two parts and bolted together, and prevented from revolving upon each other by lugs or pins upon one part fitting into corresponding recesses or holes in the other part, or by the use of two holding-bolts, the whole so arranged that the two parts may be secured together in two positions with relation to each other by revolving one of said parts upon the other just one hundred and eighty degrees, (180°,) the groove in said pulley being provided with a series of radiating ribs, projecting into said groove, upon either side thereof, nearly to the center of said groove, and to the line of division between the two parts, which is in the center of said groove and at right angles to the axis of said pulley, an odd number of ribs being used upon either side of said groove, so arranged and disposed, with relation to the lugs, pins, or bolts by which the two parts are held in place, that if said parts are put together in a certain way, the ribs upon either side of the groove will be opposite to each other, and thus form a sprocket or chain wheel, upon which a chain band may be used for the party to descend upon without danger of its slipping, and simply putting the same parts together in a position diametrically opposite to that just described, the ribs upon one side of the groove will be directly opposite the center of the spaces between the ribs upon the other side, thus forming a zigzag path or groove, in which a hemp or wire rope may be used, as described in my patent of June 3, 1873. It further consists in the formation, upon one end of said pulley, of one or more arms, radiating therefrom into a chamber of considerably greater diameter than the pulley, each of which is provided with a forked end, to which are hooked one or more weighted brake-levers, arranged to revolve in said chamber and to be thrown outward against the inner wall of said chamber by centrifugal action, to serve as a brake to retard the speed of revolution of the chain or rope pulley, and prevent any unpleasant acceleration of speed in the descent. It also consists in the peculiar formation and arrangement of the brake-levers, whereby two brake-levers attached to two different arms of the pulley, and projecting therefrom into the space between said two arms, cross each other, and each extend nearly to the opposite arm, thus enabling a much greater leverage to be obtained with said levers, and a much greater retarding force exerted upon the pulley, said levers being weighted at their free ends, and so shaped that when they are thrown outward by centrifugal action pivoting upon the point of attachment to the arms of the pulley they will each press against the interior wall of the chamber at a point near its pivotal point, but between it and the weighted end. My invention further consists in mounting the rope or chain pulley in a cylindrical bearing of considerably greater diameter than the diameter of that part of the pulley where the rope or chain rests, in combination with a brake-lever chamber cylindrical in form, but arranged slightly eccentric to the cylinder in which the rope or chain pulley revolves, as will be more fully described. It also consists in the combination of mechanism for lowering goods from lofts, to be used as a fire-escape, and for other purposes, of a chain band or two-ended chain, a sprocket or chain wheel fitted to revolve upon bearings larger in diameter than the bearing of the chain, and one or more weighted brake-levers connected to and revolving with said chain-wheel, and arranged so as to be thrown outward by centrifugal action thereon, and, acting upon the inner wall of a stationary and circular chamber, serve as a retarding force to prevent unpleasant acceleration in the descent of the falling body.

In the drawings, Figure 1 is an elevation of my improved fire-escape with the cover removed, and showing the weighted brake-levers and the chain-pulley and its arms in elevation. Fig. 2 is a vertical section on line $xx$ on Figs. 1 and 3. Fig. 3 is a section on line $yy$ on Fig. 2. Fig. 4 is a plan of the chain and chain-wheel with its radiating arms, removed from the casing. Fig. 5 is an elevation of the inner side of one of the parts of the chain-wheel, and Fig. 6 is an edge view of the same.

A is a casing, made preferably of cast-iron, and having formed therein the circular chamber B, and provided with the cover A′, secured thereto by the lugs or ears $a\,a$ and the screw $b$, and also with the eye C, by means of which, and a rope, chain, or other suitable flexible material, the apparatus may be suspended from a window by securing it to a hook provided for the purpose, or to any convenient article of furniture within the room of sufficient strength. Upon the side of the casing A, opposite to the cover A′, is made a large circular opening, slightly eccentric to the circular chamber B—that is, with its axis placed slightly above the axis of the chamber B, and around said opening is a projecting circular rib, D, forming a short hollow cylinder, in which is mounted, so as to revolve therein, the chain-pulley E, made in two parts, the line of separation being at right angles to the axis thereof and through the center of the groove $c$, said pulley or wheel having its bearing upon its periphery, and of considerably greater diameter than the bottom of the groove $c$, in which the chain or rope by which it is set in motion rests. Each of the parts of which the pulley E is made has formed in its side one-half of the groove $c$, and has formed upon the side wall of said groove, and radiating from the bottom thereof, a series of ribs, $d\,d$, projecting toward and nearly to the center of the groove or the line of division between the two parts, an equal but odd number of said ribs being used upon both parts. The two parts of the pulley E are secured together by the central bolt F and nut F′, and the two parts are held in place and prevented from revolving upon each other by the lugs $e\,e$ projecting from one piece, and corresponding recesses formed in the other piece, into which said lugs fit, the arrangement of said lugs and recesses with relation to the ribs $d\,d$ being such that if the two parts are put together, as shown in the drawings, the ribs $d$, upon either side of the groove $c$, will be poposite each other, and form a sprocket or chain wheel, adapted to be operated by the chain G in a well-known manner.

If it is desired to fit up a machine to be operated by a rope instead of a chain, all that is required is to turn one of the parts of the pulley E upon the other just one hundred and eighty degrees, (180°,) and bolt them together, when the ribs $d$ upon one side of the groove $c$ will be opposite the center of the spaces between the ribs $d$ upon the other side, thus forming a zigzag groove, in which a rope may be used without slipping, as described in my patent of June 3, 1873, the rope entering and passing out of the casing through the hole $f$ in the lower side of the rib D. If a chain is used it will enter the casing at $g$ and pass out at $h$, or vice versa, as the apparatus will operate equally well in either direction. H H H are arms cast upon one of the parts of the pulley E, or otherwise secured thereto, and radiating therefrom, at equal intervals of distance, into the chamber B, and reaching nearly to the periphery thereof, and having their outer ends forked, as shown in Fig. 1. I I I are weighted levers, two of which are attached, by the lips or hooks $i\,i$ upon their light ends, to the forked outer end of each of the radiating arms H, and projecting therefrom toward and nearly to the next arm H—one upon either side of the arm to which it is connected—said weighted levers having the middle portion of their length reduced in thickness to one-half the depth of the chamber B, so that two weighted levers attached to two contiguous arms, and lying in the space between said arms, may cross each other without detriment to the free and independent action of either, and their outer edges being so shaped that as they pass over the upper half of their revolution they will come in contact with the inner surface of the wall of the chamber B as they are thrown outward by centrifugal action, the point of contact therewith being near their pivotal points or the point of connection to the arms H, but between said point and their weighted ends, the crossing of said levers enabling a greater leverage, and consequent greater retarding force, to be obtained by the increased length of the levers.

As the weighted levers acted upon by the force of gravity will drop against the wall of the chamber when passing the lower or under half of their revolution unless a high speed is obtained, and thereby exert too much retarding force when the machine is running slow, and perhaps stop the machine, I make the chamber B eccentric to the axis of the pulley E, and consequently to the circle of revolution of the weighted levers I I. By this arrangement the levers I in passing around the lower half of their revolution have to move a greater distance radially to come in contact with the wall of the chamber B, and in consequence, when they come in contact therewith, the points of contact are much nearer the weighted ends of the levers, thereby materially reducing the retarding force exerted as the result of the action of gravity, which would be very injurious when the machine is running slow.

What I claim as new, and desire to secure by Letters Patent of the United States, is—

1. In a machine for lowering goods, to be used as a fire-escape and for other purposes, a grooved pulley divided into two parts in a plane at right angles to its axis, provided with the ribs $d$ $d$ on either side of said groove, and the lugs $e$ $e$ upon one part, and corresponding recesses in the other part arranged to be secured together in two opposite positions at will, to form a sprocket or chain wheel, or a pulley adapted to be operated by a rope, substantially as described.

2. The weighted levers I I, provided with the lips or hooks $i$, arranged with relation to each other, and connected to the arms H H, as shown, and serving as brakes to retard the speed of revolution by being thrown outward by centrifugal action against the inclosing casing, substantially as described.

3. The arrangement of the chamber B eccentrically to the axis of the revolving parts, substantially as described, for the purpose specified.

Executed at Boston this 18th day of June, 1873.

JOSEPH A. TALPEY.

Witnesses:
S. A. WOOD,
N. C. LOMBARD.